May 12, 1959   A. M. PASINSKI   2,886,087
LOCK NUT HAVING A CONICALLY TAPERED REDUCED END PORTION
Filed July 11, 1956

INVENTOR.
ARTHUR M. PASINSKI
BY
ATTORNEY

United States Patent Office 2,886,087
Patented May 12, 1959

2,886,087

LOCK NUT HAVING A CONICALLY TAPERED REDUCED END PORTION

Arthur M. Pasinski, Detroit, Mich., assignor to Burroughs Corporation, Detroit, Mich., a corporation of Michigan Application July 11, 1956, Serial No. 597,217

1 Claim. (Cl. 151—19)

This invention relates to an improved lock nut construction for use with a threaded member such as a bolt and the like.

The invention has for its objects to provide a reuseable lock nut which is of unitary, one piece construction that is simple and inexpensive to manufacture, which is of minimum axial length or thickness, and which provides positive reliable locking action without requiring a large application of torque for tightening the nut.

In accordance with the present invention, there is provided an internally threaded lock nut having an integrally formed, reduced shoulder section in the form of a tapered axial hub or nipple projecting from one face thereof a distance slightly less than the pitch of the thread in the nut. The diameter of the nipple or shoulder adjacent the body of the nut is slightly greater than the major diameter of the thread. The tapered end of the nipple is reduced to a dimension which, measured from the axis of the bore in the nut, is slightly less than the major radial dimension of the thread and severs a portion of the thread beyond the face of the nut, thereby interrupting the peripheral continuity of the conical nipple. Thus when the nut is applied to a threaded member such as a bolt that passes through a cylindrical opening in one or more interposed mechanical parts, a portion of the peripherally discontinuous, tapered nipple is received within and seats against the wall of the opening in the adjacent part, and is caused to be elastically deformed and wedged tightly against the wall of the opening and the threads of the bolts as the nut is drawn up on the bolt.

The nature of the present invention together with the above and other objects, features, and advantages thereof will appear more fully from the following detailed description and drawings: wherein Fig. 1 is a side elevation view of a lock nut formed in accordance with the present invention;

Figure 1:
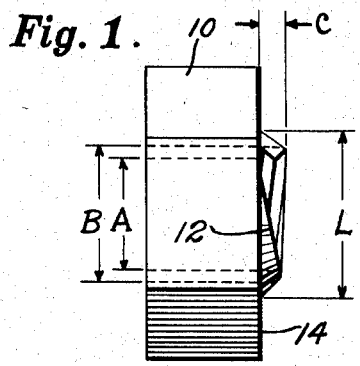

Referring to the drawings, Fig. 1 illustrates a hexagonal lock nut 10 in accordance with the invention having an integrally formed, reduced central section in the form of tapered axial nipple or shoulder 12 projecting from one face 14 thereof. The nut is shown threaded throughout its length, including the length of the reduced section, with a standard 45 degree V-thread, the major diameter of which is indicated by the dimension B and the minor diameter by A.

In accordance with the invention, the axial length C of the reduced section measured from the body of the nut to the forwardmost edge thereof is slightly less than the distance between a pair of threads in the nut or the pitch p of the thread. The diameter L of the hub or stem-like reduced shoulder section joining the body or face of the nut is slightly greater than the major diameter B of the thread, while the tapered end of the shoulder is reduced to a dimension slightly less than the major diameter of the thread in the nut. The reduction at the tapered end of the shoulder should be sufficient to cause the forward edge of the shoulder to intersect and sever a portion of the thread beyond the face of the nut. The conical surface of the axial shoulder, therefore, will have a segment removed therefrom corresponding to the helical excursion of the thread in the nut, and its forward edge will vary radially between the major and minor diameters of the thread and define a helix coinciding with the helical convolution of the thread in the portion of the shoulder attached to the nut.

Figure 2:
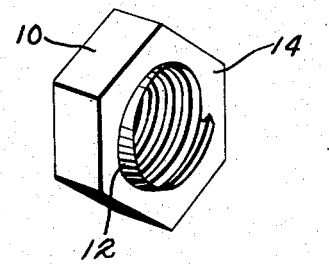
Fig. 2 is a perspective view of the lock nut of Fig. 1.

The peripheral discontinuity and helical formation of the forward edge of tapered shoulder 12 are best seen in Fig. 2. The helix emerges from a point on the face of the nut and terminates approximately one turn therefrom at a point which is axially displaced from the face of the nut a distance slightly less than the turn of one thread and is spaced radially from the axis of the nut a distance slightly less than the radius of the major diameter of the thread.

Figure 3:
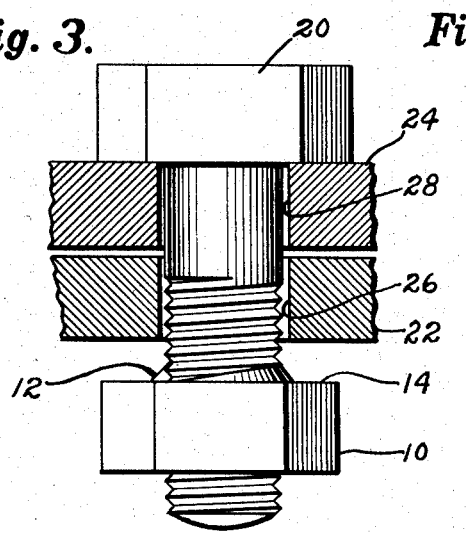
Figs. 3 and 4 are side elevation views of the nut applied to a bolt for fastening a pair of interposed members and illustrate the nut in its retracted and in its tightened or locked position, respectively, on the bolt.
Figure 4:
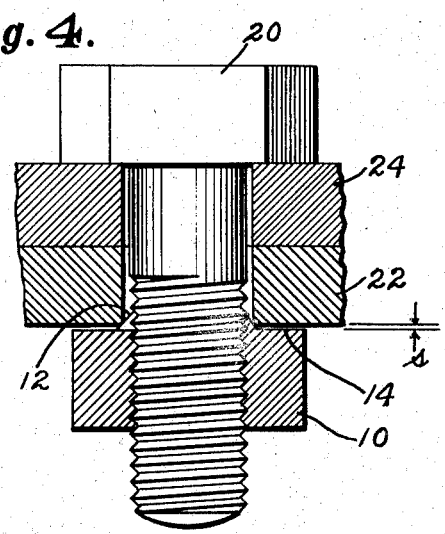

The nut is illustrated in Figs. 3 and 4 applied to a threaded member such as a headed bolt 20 for fastening a pair of mechanical parts 22, 24, such as a pair of panel members, for example, having aligned cylindrical openings 26, 28 therein for receiving the shank of the bolt. The relative diameter of the panel openings to the diameter of the bolt will be dictated by individual engineering standards, but, for purposes of illustration and not to be taken in a limiting sense, the diameter of the panel opening may be greater than the major diameter of the threaded bolt and nut members by, say, approximately 0.001 inch. The diameter of the tapered shoulder at its base or enlarged end adjacent the body of the nut may be, say, 0.005±0.0005 inch greater than the major diameter of the thread.

Since the tapered end of the shoulder is slightly smaller than the opening at the face of the panel member and the enlarged end is greater than the diameter of the opening, the forward end of the shoulder will freely enter the opening up to a point where the outer radial dimension of the shoulder is equal to the radius of the opening, causing an intermediate portion of the shoulder to seat against the forward edge of the wall of the opening.

The nut is composed preferably of comparatively hard, non-ductile material which is at least as hard as the material of the part or parts fastened thereby, so that the material of the shoulder will not expand or flow into the opening as the nut is drawn up on the threaded member against the panel. Owing also to the peripheral discontinuity of the shoulder, its resistance to radial contraction or deflection is considerably weakened, and its forward edge will be elastically or resiliently deformed under the application of force thereto. Thus, as the nut is tightened on the bolt, it will wedge or cam against the wall of the opening and its resilient forward edge will bend slightly and firmly grip and engage the thread of the nut, frictionally locking the nut thereto.

Since the surface of the reduced section is not of continuous transverse formation, the force or torque applied to tighten the nut is not distributed uniformly around the surface of the shoulder. Therefore, a lesser amount of pressure will be required to tighten and lock the nut than otherwise would be required if its surface were continuous in a plane transverse to the axis of the shoulder and there were continuous line contact of the nipple with the wall of the opening in the plane of the opening.

By reason of the present construction, no destruction or permanent deformation of the shoulder is encountered. The original shape and dimensions of the shoulder are restored when the nut is backed-off and disassembled from the bolt, thereby enabling the nut to be salvaged and to be used again for other applications.

Figure 5:
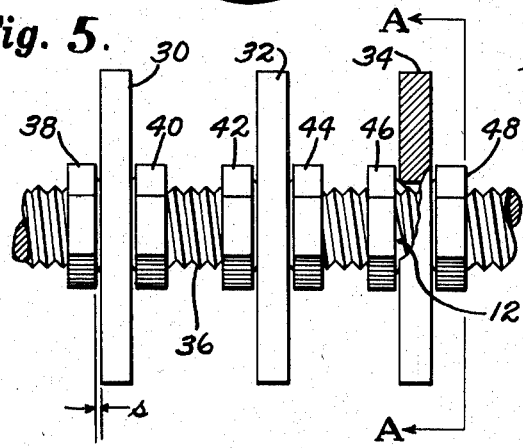
Fig. 5 illustrates the invention in a jam nut application in which a pair of lock nuts on a threaded member are used to lock an interposed part in any desired angular position.
Figure 5A:
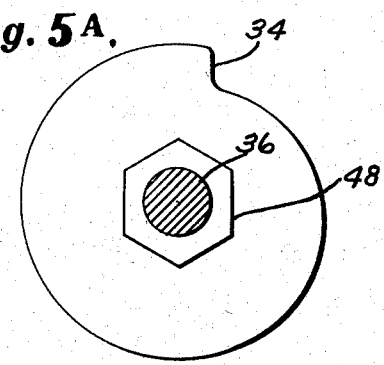
Fig. 5A is a view taken in the direction A—A of Fig. 5.

In the jam nut application illustrated in Figs. 5 and 5A, several apertured mechanical elements 30, 32 and 34 are shown located axially of and locked to a threaded member such as a worm shaft 36 by separate pairs of lock nuts 38, 40; 42, 44 and 46, 48. The relative dimensions of the openings in the parts to the tapered end and to the enlarged end of the reduced shoulder of each nut may be the same as specified hereinabove. The parts 30, 32 and 34 may be cam elements, one of which is illustrated in Fig. 5A, such as are employed in rotary timing switches in which the cams are located on a shaft in predetermined angular positions relative to a reference axial plane. Conventional lock nuts have been found to loosen under the shock and vibration conditions encountered in applications of this character, thereby losing the critical angular position of the cam and causing malfunction of the timing switches and apparatus associated therewith. The lock nuts of the present invention, however, have been found to provide positive reliable locking action after continued prolonged operations.

Since the axial length of the nipple is slightly less than the distance of one thread from the face of the nut and a substantial portion of the nipple is received within the opening in the member 22, the distance $s$ from the member to the face of nut can be held to a minimum. This distance will be less than the corresponding distance to the face of the nut presented with other locking devices that require a separate, additional locking member, such as a washer, interposed between the member 22 and the face of the nut. The overall axial length or thickness of the one piece lock nut of the present invention, therefore, can be made less than that of such other multiple part locking devices of the above character, thereby permitting the instant lock nut to be employed where minimum axial clearance is available.

The nut is well adapted to fabrication by automatic screw machine processes but can be formed by various other mechanical processes as well as by molding or casting. Where the nut is formed by machining or grinding, the tapered axial shoulder may be formed by undercutting a transverse section of the nut or stock the axial thickness of which is no greater than the pitch of one thread of the nut, reducing the section to a dimension that is slightly greater than the radial dimension of the inner or major diameter of the threaded nut as measured from the axis of the nut, and simultaneously or subsequently tapering the reduced section until the end of the shoulder opposite the face of the nut just intersects or is very slightly less than the major radial dimension of the threaded nut.

For most cases that will be encountered, the difference between the dimension L of the enlarged end of the shoulder and the major diameter B of the thread will be no greater than and will usually be less than the difference B—A between the major and minor diameters of the thread. The angle that the tapered shoulder makes with the face of the nut then may be taken approximately as the supplement of the angle whose tangent is equal to the quotient of the pitch $p$ of the thread divided by one-half the difference of B—A or $$\frac{2p}{B-A}$$

Preferably the nut or rod stock from which the nut is formed is bored and threaded prior to reducing an end section of the nut to form the tapered axial shoulder. If desired, however, the tapered shoulder can be formed prior to the tapping operation. In this event, the axial length of the shoulder may be made equal to the pitch of the proposed thread. Then, by making the diameter of the enlarged end of the shoulder slightly greater than the major diameter of the thread and the diameter of its tapered end less than the major diameter of the thread, upon the subsequent tapping of the nut, the major diameter of the tap will intersect and sever a portion of the surface of the shoulder and impart thereto the peripheral discontinuity described herein.

The above described embodiments illustrate but a few of the many possible applications of the present invention. It is apparent that the principles of the invention may be applied to lock nuts having shapes and thread formations other than those illustrated herein.

I claim:

A combined lock and fastening nut of unitary, one-piece construction comprising a body portion having a plurality of threads therein and an integrally formed, right conically tapered nipple section presenting a helically-extending, forwardly-facing portion that projects axially from a face of the body portion of the nut, and forms a continuation of a true thread face extending through the nut, said nipple portion merging into the face of the nut body at a point displaced slightly less than one full turn of the helical convolution of the outer edge of the nipple section from its most forward terminal point, the diameter of the nipple end portion displaced from the nut body gradually increasing from a minimum dimension that is less than the major diameter of a thread in the nut to a maximum dimension greater than the major diameter of the thread, the aforesaid point where the outer edge of the nipple section merges into the face of the nut body corresponding to the point where the nut thread emerges from the face of the body portion of the nut.

References Cited in the file of this patent

UNITED STATES PATENTS

| 901,810 | Hemsteger | Oct. 20, 1908 |
| 1,928,769 | Teetor | Oct. 3, 1933 |
| 2,278,962 | Young | Apr. 7, 1942 |
| 2,288,959 | Squire | July 7, 1942 |
| 2,542,023 | Friedman | Feb. 20, 1951 |

FOREIGN PATENTS

| 691,000 | France | July 1, 1930 |